United States Patent
Barrandon et al.

(10) Patent No.: US 7,151,149 B1
(45) Date of Patent: Dec. 19, 2006

(54) NON-DRIP SILICONE ELASTOMER COMPOSITION, CROSSLINKABLE BY POLYADDITION, AND ITS USES FOR MAKING JOINTS IN SITU AS ADHESIVE IN PARTICULAR IN SADDLERY

(75) Inventors: Georges Barrandon, Mornant (FR); Fabienne Howe, Caluire (FR); Olivier Loubet, Lyons (FR); Bernard Moulin, Brignais (FR); Alain Pouchelon, Meyzieu (FR)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

(21) Appl. No.: 09/958,181

(22) PCT Filed: Apr. 7, 2000

(86) PCT No.: PCT/FR00/00897

§ 371 (c)(1),
(2), (4) Date: Nov. 30, 2001

(87) PCT Pub. No.: WO00/60011

PCT Pub. Date: Oct. 12, 2000

(30) Foreign Application Priority Data

Apr. 7, 1999 (FR) .................... 99 04612

(51) Int. Cl.
*C08G 77/08* (2006.01)
*C08L 83/05* (2006.01)
*C08L 83/07* (2006.01)

(52) U.S. Cl. .................. 528/16; 524/463; 524/892; 523/218; 156/329

(58) Field of Classification Search ............... 524/463, 524/862; 528/16; 523/218; 156/329
See application file for complete search history.

(56) References Cited

U.S. PATENT DOCUMENTS 4,104,351 A   8/1978   Blizzard et al. ............ 264/235
5,561,329 A * 10/1996   Mine et al. ................. 257/788

FOREIGN PATENT DOCUMENTS

| EP | 0 124 235 | 11/1984 |
|---|---|---|
| EP | 0 279 414 | 8/1988 |
| EP | 0 487 079 | 5/1992 |
| EP | 0 618 271 | 10/1994 |
| EP | 0 686 669 | 12/1995 |
| FR | 2316286 | 1/1977 |
| GB | 754164 | 8/1956 |

* cited by examiner

*Primary Examiner*—Tae H. Yoon
(74) *Attorney, Agent, or Firm*—James C. Lydon

(57) ABSTRACT

A non-drip, preferably self-adhesive, silicone elastomer composition crosslinkable by polyaddition, such as those polyorganosilanes (POS) bearing $C_2\text{=}C_6\text{≡}Si$-alkenyl units and $\text{≡}Si\text{—}H$ units but excluding fluorinated POS. The composition includes at least a thixotropic additive containing at least a fluorinated resin, preferably based on polyfluoroethylene (PTFE). The composition may be prepared from a Si—Vi polydimethylsiloxane (PDMS) and a Si—H PDMS crosslinked by platinum catalysis. Polytetrafluoroethylene, a filler, particularly one containing silicone, optionally a ternary adherence promoter such as vinyltrimethosilane/glycidoxypropyltrimethoxysilane/butyl orthotitanate, and other typical additives may be added to the composition. The composition (not excluding the fluorinated POS as a possible constituent in the composition) may be used to produce joints in situ and/or as an adhesive, particularly in upholstery.

21 Claims, No Drawings

NON-DRIP SILICONE ELASTOMER COMPOSITION, CROSSLINKABLE BY POLYADDITION, AND ITS USES FOR MAKING JOINTS IN SITU AS ADHESIVE IN PARTICULAR IN SADDLERY

This application is a U.S. National Stage of International application PCT/FR00/00897, filed Apr. 7, 2000 and published on Oct. 12, 2000 in the French Language, and which claims priority of French Patent Application 99/04612, filed Apr. 7, 1999.

TECHNICAL FIELD

The general field of the invention is that of silicone elastomer compositions that are room-temperature or heat-vulcanizable by polyaddition, compositions of the two-component polyaddition type (RTV 2) or even two-component heat polyaddition type (HVE2) being more particularly concerned.

One subject of the present invention is thus a novel self-adhesive non-drip silicone elastomer composition which is crosslinkable by polyaddition.

The present invention is also directed toward the use of this non-drip non-elastomer composition for making joints in situ such as yielded joints, profiled joints on a component and injected joints, and also toward the uses of this non-drip composition in assembly by bonding, especially of components of a textile nature (e.g. upholstery).

PRIOR ART

In these uses, it is advantageous to have available a crosslinkable elastomer composition which has rheological properties such that they can be ready to be shaped and/or applicable to substrates to be assembled and/or jointed (good fluidity), on the one hand, and such that it is able to conserve the shape which has been given to it at least for the time required for crosslinking, thus allowing the memory of the intended shape to be permanently fixed. Crosslinkable silicone elastomer pastes may be qualified in this non-drip rheological state. Such non-drip rheological behavior is particularly welcome in uses for forming joints in situ, molding, stamping/pad printing and bonding. Specifically, it is important in these applications that the elastomer composition should not run in the interstices. In the case of textile components to be bonded, this makes it possible to avoid an excessive impregnation of the fabric with the adhesive.

In a vain attempt to achieve these non-drip rheological characteristics, it was hitherto envisaged to use conventional thixotropic agents for thickening silicone elastomer compositions to the desired extent, without, however, affecting their workability or their fluidity which is required for their handling and shaping. Among the conventional thixotropic agents which may be used, mention may be made of systems based on amine (polymer chain, preferably a silicone polymer chain grafted with primary or secondary amine functions) or on polyglycols.

The observation cannot be avoided that these conventional thixotropic agents have not hitherto made it possible to satisfactorily thicken all polyaddition silicone formulations to make them non-drip, and thus to open up advantageous perspectives in uses for which this characteristic is fundamental.

The polyorganosiloxane (POS) compositions concerned are polyaddition RTVs or LSRs. The expressions RTV and LSR are well known to those skilled in the art: RTV is the abbreviation for "room temperature vulcanizing" and LSR is the abbreviation for "liquid silicone rubber".

It is known practice to thicken heat-vulcanizable elastomers (HVEs) with peroxide, using polytetrafluoroethylene (PTFE) sold under the brand name Teflon®.

Thus, Japanese patent application no. 60-036 171 describes an elastomer material comprising from 0.01% to 50% by weight of PTFE powder. The elastomer material may especially be silicone containing a vulcanizing agent such as an organic peroxide, and optionally also pulverulent fillers of the silica, carbon black or talc type. The incorporation of Teflon® is presented as improving the dimensional stability and the working life of the elastomer.

European patent application no. 618 271 describes a silicone elastomer composition comprising:
(a) 100 parts by weight of POS of the SiVi type,
(b) 0.01–50 parts by weight of a fluorinated resin (PTFE) powder,
(c) 0.01–40 parts by weight of a perfluorinated POS,
(d) 10 to 100 parts by weight of a reinforcing silica powder with a specific surface area of at least 50 $m^2/g$,
(e) a crosslinking agent, for example of peroxide type.

This composition is said to have improved physical properties in the crosslinked state and is said to be easier to obtain than the compositions of the prior art containing fluorinated resin powders.

Japanese patent application no. 68-003 980 describes a silicone elastomer composition comprising a POS containing an Si-alkenyl (Si-vinyl) function which can undergo free-radical crosslinking using an organic peroxide, the composition also comprising a paste consisting of 20% PTFE powder dispersed in a liquid formed from a silicone oil, in which is dissolved a silicone copolymer resin. Teflon® is added to the resin+diorganosiloxane oil mixture in order to obtain a semitranslucent paste. Apparently, the silicone elastomer thus formulated is said to have excellent tensile strength and heat resistance properties and properties of resistance to oils and solvents.

Japanese patent application no. 58-194 949 relates to an HVE silicone elastomer composition comprising a POS of the PDMS type, a pulverulent filler, fatty acid esters of $C_8$ and above, fatty acid amides of $C_8$ or above, or paraffin, and also 0.01 to 5 parts by weight of PTFE resin powder, 100 parts by weight of POS and 10 to 500 parts by weight of filler (fumed silica).

The role of the PTFE in this silicone elastomer composition of HVE polycondensation type is not that of a thixotropic agent.

BRIEF DESCRIPTION OF THE INVENTION

In such a prior art, one of the essential objectives of the present invention is to provide a silicone elastomer composition which is crosslinkable by polyaddition and which has non-drip rheological behavior.

Another essential objective of the present invention is to provide a non-drip and in particular self-adhesive silicone elastomer composition which is crosslinkable by polyaddition.

Another essential objective of the present invention is to provide a non-drip, in particular self-adhesive, silicone elastomer composition which is crosslinkable by polyaddition, which can readily be shaped and which is capable of conserving the shape thus fashioned, at least for the time required for the crosslinking.

Another essential objective of the invention is to provide a non-drip and in particular self-adhesive silicone elastomer composition of polyaddition type which can be obtained simply and economically.

Another essential objective of the present invention is to provide a process for applying a non-drip and in particular self-adhesive crosslinkable silicone elastomer composition, in the manufacture of joints in situ such as yielded joints, joints profiled in place and injected joints.

Another essential objective of the present invention is to provide a process for applying a silicone elastomer composition which is crosslinkable by polyaddition, in particular a non-drip and self-adhesive composition, in molding and in stamping (pad printing).

Another essential objective of the present invention is to provide a process for applying the non-drip and in particular self-adhesive silicone elastomer composition which is crosslinkable by polyaddition, in bonding of fibrous materials, for example textiles, especially in upholstery.

Another essential objective of the present invention is to provide joints made of crosslinked silicone elastomer, obtained in situ, by shaping and crosslinking a non-drip and in particular self-adhesive crosslinkable silicone elastomer precursor.

Another essential objective of the present invention is to provide an adhesive comprising the abovementioned silicone elastomer which is, in particular, non-drip and self-adhesive.

These objectives, among others, are achieved by the present invention, which relates, firstly, to a non-drip silicone elastomer composition, which is crosslinkable by polyaddition, of the type comprising polyorganosiloxanes (POSs) bearing ≡Si—$C_2$-$C_6$ alkenyl units and ≡Si—H units, with the exclusion of fluorinated POSs, characterized in that it contains at least one thixotropic agent containing at least one fluorinated resin, preferably based on polyfluoroethylene (PFE) and even more preferentially based on polytetrafluoroethylene (PTFE).

This novel and advantageous use of fluorinated resin preferably of PFE and even more preferentially of PTFE, makes it possible to control the rheology of silicone elastomer compositions which are crosslinkable by polyaddition and, in particular, makes it possible to give these compositions non-drip viscoelastic behavior. Thus, the inventors have, to their credit, demonstrated that fluorinated resins, preferably PFEs and even more preferentially PTFE (Teflon®), are a practical and efficient means for thickening silicone formulations that are crosslinkable by polyaddition. This advantageous functionality of fluorinated resins, preferably PFE and even more preferentially of Teflon®, have not hitherto been disclosed, or even suggested in such a context and for such purposes.

The updating of this novel thixotropic additive for a polyaddition silicone elastomer which is traditionally fluid is particularly valued in uses in molding, stamping, pad printing, production of joints in situ and bonding, especially of textiles.

For the purposes of the invention, the term "fluorinated resin" means any fluoropolymer containing C—F bonds, such as, for example:
polyvinyl fluoride,
polyvinylidene fluoride,
polytetrafluoroethylene (PTFE),
polymonochlorotrifluoroethylene,
polyfluoropolyethers,
copolymer of ethylene and of tetrafluoroethylene,
copolymer of tetrafluoroethylene and of perfluorovinyl ether,
copolymer of perfluoroethylene and of perfluoropropylene, cf. Encyclopedia of Chemical Technology—4th Edition, 1994, Vol. 11—pp. 621–721.

The fluorinated POSs that are excluded from the composition according to the invention are those which are substituted with at least one fluorine atom per molecule.

DETAILED DESCRIPTION OF THE INVENTION

According to one preferred characteristic of the invention, the POSs which are included in the composition consist of siloxy units

and/or of siloxy units of formula:

in which formulae the various symbols have the following meaning:
the symbols R, which may be identical or different, each represent a nonhydrolyzable group of hydrocarbon-based nature, this radical possibly being:
an alkyl radical containing from 1 to 5 carbon atoms and possibly comprising from 1 to 6 chlorine atoms,
cycloalkyl radicals containing from 3 to 8 carbon atoms and possibly containing from 1 to 4 chlorine atoms,
aryl or alkylaryl radicals containing from 6 to 8 carbon atoms and possibly containing from 1 to 4 chlorine atoms,
cyanoalkyl radicals containing from 3 to 4 carbon atoms; methyl groups; ethyl groups; propyl groups; isopropyl groups; butyl groups; isobutyl groups; n-pentyl groups; t-butyl groups; chloromethyl groups; dichloromethyl groups; α-chloroethyl groups; α,β-dichloroethyl groups; β-cyanoethyl groups; γ-cyanopropyl groups; phenyl groups; ρ-chlorophenyl groups; m-chlorophenyl groups; 3,5-dichlorophenyl groups; trichlorophenyl groups; tetrachlorophenyl groups; o-, p- or m-tolyl groups; xylyl groups such as 2,3-dimethylphenyl and 3,4-dimethylphenyl, being preferred;
methyl and phenyl radicals being particularly preferred;
symbols Z each representing a hydrogen atom or a $C_2$-$C_6$ alkenyl group (preferably vinyl);
n=an integer equal to 0, 1, 2 or 3;
x=an integer equal to, 1, 2 or 3;
y=an integer equal to 0, 1 or 2;
the sum x+y being in the range from 1 to 3.

The nature of the polyorganosiloxane and thus the ratios between the siloxy units (I) and (II) and the distribution thereof are, as is known, chosen as a function of the crosslinking treatment which will be carried out on the curable composition in order to convert it into an elastomer.

As examples of siloxy units of formula (II) constituting the POS, mention may be made of: vinyl-dimethylsiloxyl, vinylphenylmethylsiloxyl, vinylmethyl-siloxyl and vinylsiloxyl.

The dimethylsiloxyl, methylphenylsiloyl, diphenylsiloxyl, methylsiloxyl and phenylsiloxyl units are examples of siloxyl units of formula (I) of the POS.

Examples of POSs are linear and cyclic compounds, for instance polydimethylsiloxanes with dimethylvinylsilyl end groups, poly(methylvinyl)(dimethyl)siloxane copolymers containing trimethylsilyl end groups, poly(methylvinyl)(dimethyl)siloxane copolymers containing cyclic polymethylvinylsiloxane and dimethylvinylsilyl end groups.

The polyorganosiloxane compositions according to the invention may be two-component or one-component. They crosslink at room temperature or with heating, by means of polyaddition reactions, essentially by reacting hydrogenosilyl groups with alkenylsilyl groups, in the presence of a metallic catalyst, generally a platinum-based catalyst, are described, for example, in patents U.S. Pat. Nos. 3,220,972, 3,284,406, 3,436,366, 3,697,473 and 4,340,709. The polyorganosiloxanes forming part of these compositions generally consist of pairs based, on the one hand, on a linear, branched or crosslinked polysiloxane consisting of units (II) in which the residue Z represents a $C_2$–$C_6$ alkenyl group (preferably vinyl), and in which x is at least equal to 1, optionally combined with units (I), and, on the other hand, on a linear, branched or crosslinked hydrogenopolysiloxane consisting of units (II) in which the residue Z then represents a hydrogen atom and in which x is at least equal to 1, optionally combined with units (I).

More specifically, the composition according to the invention also comprises the thixotropic agent based on fluorinated resin, preferably PFE and even more preferentially PTFE:

A. at least one polyorganosiloxane containing, per molecule, at least two $C_2$–$C_6$ alkenyl groups linked to the silicon, B. at least one polyorganosiloxane containing, per molecule, at least two hydrogen atoms linked to the silicon, C. a catalytically effective amount of at least one catalyst composed of at least one metal belonging to the platinum group, D. optionally at least one POS resin, preferably bearing radicals Z=$C_2$–$C_6$ alkenyl or H linked to the silicon, E. optionally an adhesion promoter, which is preferably ternary, and even more preferentially consisting of:
  E.1. at least one alkoxy organosilane containing, per molecule, at least one $C_2$–$C_6$ alkenyl group,
  E.2. at least one organosilicon compound comprising at least one epoxy radical,
  E.3. at least one chelate of a metal M and/or a metal alkoxide of general formula: M(OJ)$_n$, with n=valency of M and J: linear or branched $C_1$–$C_8$ alkyl, M being chosen from the group formed by: Ti, Zr, Ge, Li, Mn, Fe, Al and Mg, F. optionally, a reinforcing or nonreinforcing mineral filler, G. a polyorganosiloxane termed as an extender and containing end siloxyl units containing hydrogeno functions, H. optionally, a neutralizer, I. optionally, a crosslinking inhibitor and/or other additive(s) for use in compositions of this type, J. and, optionally, expanded or expandable mineral hollow microsphere fillers.

The compositions according to the invention may be of RTV or LSR type. As a guide, the crosslinkable RTV silicone elastomer compositions have a viscosity $\eta_{RTV}$ at 25° C. such that $\eta_{RTV} \leq 100,000$ mPa·s and the crosslinkable LSR silicone elastomer compositions have a viscosity $\eta_{LSR}$ such that $$100\ 000 < \eta_{LSR} \leq 1\ 000\ 000\ \text{mPa·s}$$

As regards the polyaddition POSs used in the compositions according to the invention (POS A—or even D), several classes of these are distinguished, which differ by their viscosity and which define polyaddition silicone elastomer compositions of RTV or LSR type.

In the case of RTV compositions crosslinking by polyaddition reactions, the polyorganosiloxane constituent(s) bearing alkenylsilyl groups advantageously have a viscosity η at 25° C.:

$$2500 \leq \eta \leq 100000\ \text{mPa·s}.$$

In the case of LSR compositions crosslinking by polyaddition reactions, the polyorganosiloxane constituent(s) bearing alkenylsilyl groups have, for example, a viscosity η' at 25° C.:

$$10000 \leq \eta' \leq 200000\ \text{mPa·s}.$$

In the case of RTV or LSR polyorganosiloxane compositions, the polyorganosiloxane constituent(s) B bearing hydrogenosilyl groups generally has (have) a viscosity at 25° C. of not more than 10 000 mPa·s and preferably between 5 and 1000 mPa·s.

All the viscosities under consideration in the present specification correspond to a dynamic viscosity magnitude at 25° C. measured, in a manner which is known per se, at a shear rate gradient which is representative of its use.

According to one variant, it may be envisaged that the composition according to the invention comprises mixtures of POSs differing by their nature and/or by their viscosity.

As regards the polyorganohydrogenosiloxane B, it is advantageously chosen from linear, cyclic or lattice homopolymers and copolymers containing on average, per molecule, preferably at least three hydrogen atoms linked to different silicon atoms and in which the organic radicals linked to the silicon atoms are chosen from methyl and ethyl radicals; at least 60 mol % of these radicals (and preferably all of these radicals) being methyl radicals.

According to one advantageous arrangement, the POS (B) is used in an amount such that the molar ratio of the hydride functions of the POS (B) to the vinyl groups POS (A) are between 1.1 and 4.

Examples of siloxyl units of which the POS (B) is composed are $H(CH_3)_2SiO_{1/2}$, $H(CH_3)SiO_{2/2}$, and $H(C_6H_5)SiO_{2/2}$.

As examples of POSs (B), mention may be made of:
polydimethylsiloxanes containing hydrogenodimethylsilyl end groups,
copolymers containing poly(dimethyl)(hydrogenomethyl)siloxanes containing trimethylsilyl end groups,
copolymers containing poly(dimethyl)(hydrogenomethyl)siloxanes containing hydrogenodimethylsilyl end groups,
poly(hydrogenomethyl)siloxanes containing trimethylsilyl end groups,
cyclic poly(hydrogenomethyl)siloxanes.

The catalysts (C) are also well known. Platinum and rhodium compounds are preferably used. Complexes of platinum and of an organic product described in patents U.S. Pat. No. 3,159,601, U.S. Pat. No. 3,159,602 and U.S. Pat. No. 3,220,972 and European patents EP-A-0 057 459, EP-A-0 188 978 and EP-A-0 190 530, the complexes of platinum and of vinyl organosiloxanes described in patents U.S. Pat. No. 3,419,593, U.S. Pat. No. 3,725,334, U.S. Pat. No. 3,377,432 and U.S. Pat. No. 3,814,730, may be used in particular. The catalyst generally preferred is platinum-based. In this case, the amount by weight of catalyst (C), calculated as the weight of platinum metal, is generally between 2 and 400 ppm and preferably between 5 and 50 ppm, based on the total weight of the composition.

The resin (D) bears alkenyl, preferably vinyl, siloxyl units of $M^{vi}$ and $D^{vi}$ type. The organic substituents of the MDT and/or Q siloxyl units of these resins are, for example, methyl, isopropyl, tert-butyl, n-hexyl or phenyl radicals.

These silicone resins are well-known branched POSs, the preparation processes of which are described in a large number of patents.

As examples of resins which may be used, mention may be made of MQ, MDQ, TD and MDT resins. More specifically, this may be in practice a resin of M, $M^{vi}$, D, $D^{vi}$ or Q type. These resins (D) may be solid or liquid at room temperature. They may be incorporated into aqueous emulsions or alternatively may be dissolved in an organic solvent or a silicone oil. They may also be in the form of aqueous emulsions. Aqueous emulsions of silicone resins which may be used are, for example, described in patents U.S. Pat. No. 4,028,339, U.S. Pat. No. 4,052,331, U.S. Pat. No. 4,056,492, U.S. Pat. No. 4,525,502 and U.S. Pat. No. 4,717,599, which are cited as references.

The adhesion promoter E, which is preferably ternary, is of the type described in French patent no. 2 719 598 incorporated into the present specification by way of reference. It should be noted that when the composition comprises an extender G, then the alkoxy organosilane E.1 preferably comprises at least one $C_3-C_6$ alkenyl group per molecule.

As regards the compound E.3, it may consist of or comprise a metal chelate. The metal M chosen may thus comprise one or more ligands, such as those derived especially from a β-diketone such as, for example, acetylacetone. The compound E.3 may also consist of or comprise a metal alkoxide having the formula M(OJ) defined above, in which the alkoxy radicals are, for example, n-propoxy and n-butoxy radicals. It should be noted that, in this formula, one or more alkoxy radicals OJ may be replaced with one or more constituent ligands of a chelate, such as, for example, an acetylacetonate ligand.

The compounds E.3 that are preferred are those in which the metal M is chosen from the following list: Ti, Zr, Ge, Mn, Al.

It will be pointed out that titanium is more particularly preferred.

Concrete examples of compounds E.3. that are particularly suitable are those in whose structure the metal M is chosen from the list: Ti, Zr, Ge, Mn and Al, and is combined:
  as regards a chelate: with ligands of acetylacetonate type,
  as regards an alkoxide: with n-propoxy or n-butoxy radicals.

The optional filler F used may advantageously be a reinforcing siliceous filler F.1 treated in situ with a compatibilizer, preferably of hexamethyldisilazane HMDZ type, in the presence of the POS (A).

The expression "in situ treatment of the siliceous filler" means the placing of the filler and the compatibilizer in contact with at least one portion of polyorganosiloxane silicone oil (A). In a particularly preferred manner, this consists essentially in introducing the compatibilizer (CA) into the preparation medium in two stages:
  firstly, before and/or substantially simultaneously with the placing of at least some of the silicone oil used in contact with at least some of the siliceous filler used, this introduction of CA (portion 1) being performed one or more times and corresponding to a proportion of less than or equal to 8%, preferably less than or equal to 5% and even more preferably less than or equal to 3% by weight relative to the total filler; and
  secondly (portion 2), after this placing in contact of silicone oil/filler.

The compatibilizer of portion (1) is thus chosen from molecules which satisfy at least two criteria:
  they must have a strong interaction with silica (hydrogen bonds) and with surrounding silicone oil;
  they themselves or their degradation products must be readily removable from the final mixture by heating under vacuum or under a stream of gas.

Compounds of low molecular weight are thus preferred. The agent of the portion (1) may be, for example:
  a silazane, preferably a disilazane, or mixtures thereof, hexamethyldisilazane (HMDZ) being preferred and possibly being combined with divinyltetramethyldisilazane,
  hydroxysiloxane which is di- or preferably monofunctional,
  an amine such as aqueous ammonia or an alkylamine of low molecular weight, for instance diethylamine,
  an organic acid of low molecular weight, for instance formic acid or acetic acid, and
  it is preferably carried out in the presence of water.

The compatibilizers of the portion (2) may be chosen from the various silazanes and disilazanes encountered above, taken alone or as mutual mixtures, preferably from disilazanes, hexamethyldisilazane which may or may not be combined with divinyltetramethyldisilazane being particularly preferred.

This in situ treatment of silica with HMDZ is described in detail in patent application WO-A-98/58997, which is incorporated in its entirety in the present specification by way of reference. In the event that such treatment leads to a basic pH, a neutralizer (H) such as, for example, a weak acid (acetic acid or phosphoric acid for example) or a silica filler such as ground quartz may be added to the dispersion.

The filler F which may be used may also be a reinforcing filler F.2 and, preferably, a siliceous filler.

The reinforcing siliceous fillers F.2 may advantageously be pretreated, for example with chlorosilanes, cyclosiloxanes or HMDZ, or other organosilicon compounds usually used for this purpose, such as organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505 and British patent GB-A-1 024 234).

The reinforcing siliceous fillers F.1 and F.2 are chosen from colloidal silicas, combustion silica powder and precipitation silica powder, and mixtures thereof.

These siliceous powders have a mean particle size which is generally in the region of or less than 0.1 μm and a BET specific surface area of greater than 50 $m^2/g$, preferably between 50 and 400 $m^2/g$ and especially between 90 and 350 $m^2/g$.

The use of a nonreinforcing filler or packing agent is not excluded as a complement.

Among the complementary semi-reinforcing fillers or packing agents F.3, mention may be made especially of diatomaceous earths, ground quartz and ground zirconia.

Other semi-reinforcing complementary fillers or packing agents are, for example, carbon black, titanium dioxide, aluminum oxide, hydrated alumina, expanded vermiculite, nonexpanded vermiculite, calcium carbonate, zinc oxide, mica, talc, iron oxide, barium sulfate and slaked lime. These complementary fillers have a particle size which is generally between 0.1 and 300 μm and a BET surface area of less than 100 m²/g.

These fillers F.1, F.2 and F.3 may be present in a proportion of from 5% to 30% and preferably from 15% to 25% for the reinforcing fillers and from 5% to 40% and preferably from 10% to 30% for the semi-reinforcing fillers or packing agents, relative to the total composition without the microspheres.

The optional extending POS (G) may be a POS containing end siloxyl units of the type: $HR^0{}_2SiO_{1/2}$ with $R^0$, which may be identical to or different than each other, corresponding to a linear or branched $C_1$–$C_6$ alkyl group and/or a substituted or unsubstituted aryl group, $R^0$ preferentially being $CH_3$.

Besides these end units, this POS (G) is, moreover, a polydiorganosiloxane, preferably a polydimethyl-siloxane.

As examples of POSs (G), mention may be made of poly(dimethylsiloxy)-α,ω-(dimethylhydrogenosiloxy)-siloxane. In practice, this α,ω-hydrogeno PDMS may be a commercial product, such as Rhodorsil® 620 H2 from the company Rhodia Chimie.

As regards the optional crosslinking inhibitor I, at least one addition reaction retarder chosen from the following compounds:
POS substituted with at least one alkenyl (preferably a vinyl) which may optionally be in cyclic form; tetramethylvinyltetrasiloxane being particularly preferred;
pyridine,
organic phosphines and phosphites,
unsaturated amides,
alkyl maleates, and
acetylenic alcohols,
may be used.

These acetylenic alcohols (cf. FR-B-1 528 464 and Fr-A-2 372 874), which form part of the preferred thermal blockers of a hydrosilylation reaction, have the formula:

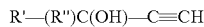

R'—(R")C(OH)—C≡CH in which formula
R' is a linear or branched alkyl radical or a phenyl radical;
R" is H or a linear or branched alkyl radical or a phenyl radical;
the radicals R' and R" and the carbon atom located α to the triple bond optionally being able to form a ring;
the total number of carbon atoms contained in R' and R" being at least 5 and preferably from 9 to 20.

Said alcohols are preferably chosen from those with a boiling point of greater than 250° C. Mention may be made, for example, of:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
2-methyl-3-butyn-2-ol;
3-methyl-1-pentadecyn-3-ol.

These α-acetylenic alcohols are commercial products.

Such a retarder (I) is present in a proportion of not more than 3000 ppm, preferably in a proportion of from 100 to 2000 ppm, relative to the total weight of the polyorganosiloxanes (1) and (2).

The microspherical fillers (J) are preferably expandable organic microspheres comprising, as is known per se, a polymer wall enclosing a liquid or a gas. The expansion of these microspheres is brought about by heating them above the softening point of the polymer and at a temperature which is sufficient to vaporize the liquid or to dilate the gas suitably, which may be, for example, an alkane such as isobutane or isopentane. The wall may consist, as is known per se, of polymers or copolymers, prepared, for example, from vinyl chloride, vinylidene chloride, acrylonitrile, methyl methacrylate or styrene monomers or mixtures of polymers and/or copolymers, for example, in particular, of acrylonitrile/methacrylonitrile copolymers or acrylonitrile/vinylidene chloride copolymer. See in particular U.S. Pat. No. 3,615,972.

They may be incorporated into the composition either in expanded form or before expansion, which may be induced, by suitable heating, during the crosslinking of the composition.

Before their expansion, the microspheres will preferably have a diameter of between 3 and 50 μm and more particularly between 5 and 30 μm.

A diameter after expansion (in situ or originally) which is especially between 10 and 150 and in particular between 20 and 100 μm will also be sought.

These microspheres will be present especially in a proportion of from 1% to 30% by weight, preferably from 2% to 10% and more preferably of more than 3% or 4% by weight relative to the total composition.

In a manner which is known per se, one or more other conventional additive(s) such as, for example, colorants, may be added to the silicone elastomer composition.

Preferably, the thixotropic agent based on polyfluoroethylene, preferably PTFE, resin is in dry pulverulent form or in dispersion—preferably an aqueous dispersion—incorporated in a proportion of from 0.1% to 10% and preferably 1% to 5% by dry weight relative to the total dry material of the composition.

According to one preferred characteristic of the invention, the composition has a Matthis flow index (MF) such that:

|  | MF < 1.0 |
| --- | --- |
| preferably | MF < 0.5 |
| and even more preferentially | MF = 0. |

The Matthis measurement is well known to those skilled in the art.

It consists of a flow test on a 300 mm vertical wall, in which the distance covered by the product in one minute is noted.

The test is performed on a Matthis flow meter.

The apparatus consists of a plate with a groove, at the end of which is a small semispherical cavity; the groove has a millimeter graduation scale running alongside it. The semispherical cavity of the flow meter is filled with the paste to be evaluated and the surface is leveled off.

Simultaneously, the apparatus is stood vertically and the timer is started.

After one minute has elapsed, the apparatus is laid horizontally and the distance covered by the paste is read on the graduated scale of the apparatus.

The reading is taken in mm.

The flow index is proportionally greater the greater the distance covered.

This Matthis flow index MF reflects the non-drip rheological behavior intrinsic to the compositions according to the invention.

According to another of its aspects, the present invention relates to a two-component precursor system of the silicone composition described above. Such a precursor system is in two separate parts $P_1$ and $P_2$, which are to be mixed together to form the composition, one of these parts $P_1$ or $P_2$ comprising the catalyst (C) and one or more POSs (A and/or D) or (B) bearing only one species of crosslinking group ≡Si-alkenyl or ≡Si—H, respectively.

Another characteristic of this precursor system when it comprises the promoter E, is that its part $P_1$ or $P_2$ containing the polyorganosiloxane (B) bearing only ≡Si—H, is free of compounds (E.3) contained in the promoter (E) and its part $P_1$ or $P_2$ including the compound (E.1) of the promoter (E) does not comprise the catalyst (C); the filler F.1 treated in situ, which is optionally present, is advantageously included in the part(s) $P_1$ or $P_2$ which contain the polyorganosiloxane A.

The determination and optimization of the composition of the two parts $P_1$ and $P_2$ in order to avoid placing one of the parts in contact with species liable to react together, are within the normal capabilities of a person skilled in the art.

The viscosity of the parts $P_1$ and $P_2$ and of their mixture may be adjusted by varying the amounts of the constituents and by selecting polyorganosiloxanes of different viscosity.

As examples of commercial products for the PTFE which may be used in the compositions according to the invention, mention may be made of Teflon® 6C-N sold by Dupont de Nemours. This is a powder with a particle size of 500±150 µm. It may also be Teflon® MP, which are white PTFE powders which differ from the other presentations of PTFE in granulate and fine powder form, by the size of their particles, which is very small since it is of the order of 2 to 20 µm. These Teflon® powders are also available as an aqueous dispersion.

INDUSTRIAL APPLICATION

The present invention also encompasses a whole range of applications of the silicone elastomer composition as defined above, which is crosslinkable by polyaddition and to which Teflon® is added, without, however, excluding fluorinated POSs as possible constituents of said composition.

The compositions in accordance with the invention (without exclusion of those comprising fluorinated POSs) may be used for numerous applications, for instance the pointing of joints in industry (motor vehicle and transport, household electrical and electrotechnical) and the assembly of very diverse materials (metals, plastics, glass and ceramic).

As regards the pointing of joints, they are more especially suitable for the formation of "in-situ" joints used in industry. These "in-situ" joints include several types, namely "yielded" joints also known as crushed joints, component profile joints (CPJ), also known as shape joints, and finally injected joints.

"Yielded" joints are formed after the application of a thixotropic bead of the compositions to the contact zone between two elements, then the other element is immediately applied to the first; this results in a flow of the bead before it has converted into elastomer by heating the assembly. Once the silicone composition has been crosslinked, the cohesion of the elastomer then ensures the assembly and sealing.

In the motor vehicle industry, joints of this type will be of concern in assemblies which must not be dismantled in common practice (water outlet casing joints, etc.). In household electrical appliances, mention may be made of the assembly of oven plates, the assembly of vitroceramic cooking hobs and the assembly of irons.

When compared with traditional sealing techniques of the precut cork/elastomer joint, fitted joint or O-ring joint, the "yielded" joint based on the silicone compositions according to the invention, referred to hereinbelow as the SCIs (it being pointed out that, for the applications, the SCI may comprise at least one fluorinated POS comprising at least one fluorine per molecule) allows increased efficacy of the sealing, and does so especially for the following three groups of reasons:

1. High performance silicone product:
    thixotropic,
    rapid crosslinking, one minute at 150° C.,
    high adhesion to a very wide variety of materials (plastics, metals, glass)
    long "pot life" of the product, 8 hours at room temperature,
    high resistance to thermal aging,
    good resistance to chemical attack (water, oils, coolant fluids),
    mechanical behavior indifferent to temperature differences (−70 to +250° C.)
    flexible sealing which absorbs vibrations
    weight gain compared with traditional joints;
2. Possibility of automation offering, by virtue of the thixotropic nature of the SCIs:
    perfect control of the deposition of the bead
    very rapid use
    good reproducibility
3. Practical sealing solution enabling, in certain cases:
    Simplification of the profile of the components (no machining)
    Reduction in the number of clamping points (strong adhesion of the SCIs).

These technical qualities are complemented by economic advantages:
    low cost of the feasibility tests,
    less expensive starting material and implementation than for a molded or precut joint (cost of the sealing divided by 5 to 10, excluding the depreciation of the equipment used)
    no stocks of joints, accompanied by multiple references
    no handling (manual or automated) of flexible joints
    a single product and a single piece of equipment can produce several different joint profiles
    rapid control of sealing by placing under low air pressure for a few minutes after assembly and clamping of the components.

The "component profile" joints (CPJ) are also obtained after applying a pasty bead of the compositions to the area of contact between two elements to be assembled. However, after depositing the pasty bead on one of the elements, the bead is heat-crosslinked to an elastomer and the second element is then applied to the first. The result of this is that such an assembly is easy to dismantle since the element which is applied to that which received the joint, does not adhere to this joint. Moreover, by virtue of its elastomeric nature, the joint follows the irregularities of the surface to be pointed and, as a consequence, it is unnecessary to carefully machine the surfaces which need to be placed in contact with each other and to force-clamp the assemblies obtained; these particular features make it possible to dispense with, to a certain extent, fixing joints, cross braces, ribs usually intended for stiffening and reinforcing assembly elements.

The CPJ is a closed bead of silicone elastomer of ovoid cross section deposited according to a well defined profile, which needs to ensure the sealing of two (or more) dismantlable components.

The compression and cohesion of the SCI elastomer material thus ensure the sealing. The sufficient level of properties before the first compression allows successive dismantling and reassembly of the two (or more) components, while at the same time ensuring perfect sealing.

The CPJs made of SCI have many advantages for industrial sealing applications:
1. good level of thixotropic nature of the SCI, resulting in the possibility of automation, offering:
   perfect size control of the joint
   exact positioning (no risk of tearing)
   good reproducibility
2. high-performance silicone product:
   very good setting time (1 min. at 150° C.)
   long "pot life", of 8 hours at room temperature
   very good adhesion to all substrates (glass, metals, plastics)
   high heat strength (−60° C. to +250° C.)
   good aging behavior
   high mechanical performance qualities
   high resistance to chemical attack (by water, oils, coolant fluids)
   very low compressive set
   low swelling in engine fluids
   vibration damping
3. Practical sealing solution:
   easy to dismantle: good attachment of the joint to the component equipped, and good antiadhesion on the other component
   reuse after dismantling These technical qualities are complemented by economic advantages:
   low cost of the feasibility tests (no successive molds),
   less expensive starting material and implementation than for a molded or precut joint
   no stocks of joints, accompanied by multiple references
   no handling (manual or automated) of flexible joints
   a single product and a single piece of equipment can produce several different joint profiles
   rapid crosslinking: saving in energy and rate by immediate assembly (no intermediate stock)
   rapid quality control (visual test, placing the component under pressure)
   a single finished element, CPJ solidly attached to the component, compared with two elements for a conventional solution, molded joint and component.

In the transport sector, the applications of sealing by CPJ with the SCI compositions may be extended to all the engine components which need to be dismantlable, such as, for example:
   cylinder cover
   oil pump
   oil sump
   distribution box
   clutch guide The materials constituting these components and on which the SCIs adhere perfectly may be cast iron, aluminum, galvanized sheet metal, electrogalvanized head, sheet metal painted with cataphoresis paint, polyamide, phenolic plastic resins, etc.

In the household electrical appliance sector, various CPJ applications of ASEs may be mentioned:
   electric or gas oven doors
   microwave oven or mixed oven doors
   washing machine drums The applications of CPJ made of SCI which may be envisaged in the electrotechnical and electronic industry are:
   electrical or electronic casing covers
   electronic cards.

As regards injected joints, they are formed in a confined environment, in cavities that are often closed or in molds precoated with release agents. The compositions placed in these cavities are rapidly converted by heating into an elastomer whose properties are identical to those of an elastomer obtained from curing the compositions in ambient air. To overmold the joints, it will suffice to remove the mold after crosslinking of products adhering perfectly to the support of the joint plane.

Thus, according to a first mode of use, the invention is directed toward the application of the silicone composition or of the two-component system as defined above, without the exclusion of fluorinated POSs as possible constituents of said composition, to the manufacture of joints "in situ", preferably of crushed joints, component profile joints or injected or extruded joints.

As regards the application process mentioned above and more especially concerning production of crushed joints, it is characterized in that it consists
   in producing at least one thixotropic bead from the non-drip composition which is crosslinkable into adhesive silicone elastomer as defined above, and/or from the system as defined above,
   in depositing this bead on the contact zone of at least one of the elements to be assembled,
   in assembling the elements by applying them to each other via their contact zone,
   in arranging it such that crosslinking of the elastomer takes place, preferably by heating.

As regards the application process directed toward the production of component profile joints between at least two elements to be assembled, this process is characterized in that it consists essentially:
   in producing at least one thixotropic bead from the non-drip composition which is crosslinkable into adhesive silicone elastomer as defined above, and/or from the system as defined above,
   in depositing this bead onto the contact zone of one of the elements to be assembled,
   in arranging it such that crosslinking of the elastomer for forming the bead takes place, preferably by heating,
   and in assembling the elements by applying them together at least via the contact zone comprising the bead.

As regards the application process as mentioned above, for the production of injected joints, it consists essentially in using injection devices comprising molds in which the elastomer undergoes heat crosslinking.

Where extruded joints are concerned, the application process consists essentially in using extruders, at the outlet of which the elastomer undergoes heat crosslinking.

These injection and extrusion devices are well known to those skilled in the art.

According to another of its subjects, the present invention relates to the joints obtained by the application processes according to the first mode of use as defined above.

As regards the assembly, and apart from the assembly of components by means of a yielded joint as described above, mention may be made of surface bonding applications such as the bonding of fabrics, for example on seats—upholstery—(transport sector). The SCIs are particularly suitable for this application on account of their good classification regarding fire-smoke safety regulations, on account of its good level of thixotropicity which avoids impregnation of the product before crosslinking followed by marking of the fabric, and finally on account of its good level of adhesion to the supports constituting the seats (steel, stainless steel, polyester, ABS, polycarbonate, velvet, etc.).

Thus, according to a second mode of use of the silicone elastomer composition with Teflon® added according to the invention, without the exclusion of fluorinated POSs as constituting possibilities for said composition, this composition is applied as an adhesive for assembling at least two elements. Such an application process is characterized in that it consists essentially in coating at least one of the elements to be assembled with a layer of composition according to the invention, in assembling said elements by applying them together, and in crosslinking the elastomer adhesive, preferably by heating.

According to one advantageous arrangement of the invention there are two elements to be assembled.

Even more preferentially, one of the elements to be assembled is a woven, knitted or nonwoven fibrous material made of conventional natural and/or synthetic fibers.

It may be, for example, a case of applying bonding for fibrous material, e.g. textile, especially in the context of upholstery.

Finally, the present invention relates to an adhesive, especially for upholstery, characterized in that it comprises the composition as defined above and/or the two-component system which has also been defined above, without exclusion of fluorinated POSs as possible constituents of said composition.

Besides these applications in the pointing of joints and assembly for the Teflon® thixotropic SCIs, mention may also be made of their uses in molding, stamping, pad printing, etc.

The present invention will be understood more clearly in the light of the examples which follow and which describe the effects of the incorporation of Teflon® into standard RTVs, the preparation of a polyaddition RTV elastomer composition, with added Teflon®, and also the evaluation of the rheological properties of this composition, as well as application of this composition for bonding in the field of upholstery.

EXAMPLES

Example 1

Effect of Teflon® on Standard RTVs

Teflon® makes it possible to modify the rheological behavior of the silicone compositions, and in particular to make them non-drip.

The non-drip nature may be assessed, for example, by measuring the Matthis fluid index. Thus, the progress of the composition on a vertical rule is noted, the product obviously being proportionately less runny the less it travels.

The table below shows the comparative effect of the two varieties of Teflon® added to non-self-adhesive standard RTV silicone media Rhodorsil RTV 2556 from Rhodia Silicones and Rhodorsil RTV V1065 from Rhodia Silicones to form SCIs, compared with a control polydimethylsiloxane (PDMS) containing trimethylsilyl end groups, namely the commercial product Rhodorsil V100 000 from Rhodia Silicones.

|  | TEFLON ® | MATTHIS (mm/min) |
|---|---|---|
| Silicone oil of viscosity 100 Pa.s control PDMS |  | 55 |
| Silicone oil of viscosity 100 Pa.s control PDMS | 2.5% powder 6CN | 10 |
| Silicone oil of viscosity 100 Pa.s control PDMS | 2.5% dispersion 30N | 10 |
| RHODORSIL RTV 2556 |  | 60 |
| RHODORSIL RTV 2556 | 3% powder 6CN | 0 |
| RHODORSIL RTV 2556 | 3% dispersion 30N | 0 |
| RHODORSIL RTV V1065 |  | 10 |
| RHODORSIL RTV V1065 | 1% powder 6CN | 0 |
| RHODORSIL RTV V1065 | 1% dispersion 30N | 0.6 |

The powder 6CN is a mixture of 50% ground quartz (Sifraco C600) and 50% Teflon® 6CN characterized by a particle size in the region of 500 μm.

The dispersion 30N is an aqueous 60% Teflon® dispersion.

These two presentations of Teflon® are produced by DuPont.

Example 2

Preparation of a Self-Adhesive SCI 2.1 Preparation of a Premix

A suspension referred to as a premix is first prepared by mixing together at room temperature, in a reactor with a volume of about 2 l equipped with a central stirrer of the "butterfly wing" type, the following ingredients:

resin D: 210 g of resin of structure $MM_{Vi}DD_{Vi}Q$ containing, by weight, about 0.6% of vinyl (Vi) groups and consisting of, by weight, about 17% of $(CH_3)_3SiO_{0.5}$ (units M), 0.5% of $(CH_3)_2ViSiO_{0.5}$ units (units $M^{Vi}$), 75% of $(CH_3)_2SiO$ units (units D) and 8% of $SiO_2$ units (units Q)

POS A: 400 g of a PDMS blocked with $(CH_3)_2ViSiO_{0.5}$ units having a viscosity of about 100 Pa·s and containing about 0.0022 SiVi function per 100 g of oil, 200 g of a diatomaceous earth filler with a specific surface area of about 5 m²/g and characterized by its pH in the region of 8 (Celite® 350)

10 g of magnesium oxide powder.

The whole is homogenized for about 50 min at a stirrer spin speed of 200 rpm; the temperature reached is thus about 80° C.

The apparatus is then placed under a vacuum of about 25 mm Hg and the stirring speed is increased to 500 rpm for 5 min; in this phase, the temperature reaches about 125° C.

The installation is returned to atmospheric pressure and the following are added:

the filler F+PTFE 10 g of powdery mixture consisting of 50% by weight of Teflon (Du-Pont, resin T CN®) and 50% by weight of ground quartz (Sifraco C-600).

The mixture is homogenized for a further 5 to 10 min at about 350 rpm.

The premix which is used to prepare the parts A and B of the two-component is then collected.

Part $P_1$ of the Two-Component

The following are loaded into the same mixer as before:

415 g of the premix

POS A: 81.3 g of PDMS blocked with $(CH_3)_2ViSiO_{0.5}$ units having a viscosity of about 100 Pa·s and containing about 0.0022 SiVi function per 100 g of promoter oil E.3—3.5 g of butyl orthotitanate Catalyst C—0.02 g of platinum metal in the form of a metal complex, known as a Karstedt catalyst. This mass is homogenized for 20 to 30 min at about 100 rpm. The resulting mixture is then degassed by placing under vacuum at 20 to 30 mm Hg.

Part $P_2$ of the Two-Component

The following are loaded separately into the mixer:

415 g of the premix

POS A: 47.95 g of PDMS blocked with $(CH_3)_2ViSiO_{0.5}$ units having a viscosity of about 100 Pa·s and containing about 0.0022 SiVi function per 100 g of oil, POS B: 18.9 g of a poly(dimethyl)(hydrogeno-methyl) siloxane, blocked with $(CH_3)_2HsiO_{0.5}$ units having a viscosity of about 25 mPa·s and containing in total about 0.7 SiH function per 100 g of oil promoter E.1: 9 g of vinyltrimethoxysilane (VTMO)

promoter E.2: 9 g of vinyltrimethoxysilane (VTMO)

promoter E.2: 9 g of glycidoxypropyltrimethoxy-silane (GLYMO)

inhibitor I: 0.15 g of ethynylcyclohexanol.

The mass is homogenized for 20 to 30 min at about 100 rpm. The resulting mixture is degassed by placing under a vacuum of 20 to 30 mm Hg.

2.2. Preparation of the Elastomer

The parts $P_1$ and part $P_2$ thus obtained are carefully mixed together weight for weight.

Example 3

Properties of the SCI of Example 2

For the laboratory evaluations, the product is used with the aid of a pneumatic gun for extruding the product contained in two-component cartridges (2×200 cc): the mixture is prepared using a static mixer (diameter 8, 18 mixer elements) placed immediately at the cartridge outlet.

3.1 Rheology 3.1.a. Determination of the Profile and Measurement of the Viscosity Using a Carri-Med machine with a cone diameter of 2.0 cm and an angle of 1°, 1' the viscosity falls very greatly with the shear rate to reach 150 to 200 000 mPa·s with a rate of 25 $s^{-1}$.

3.1.b. Determination of the Profile and Measurement of the Viscosity

According to the test method Renault D55 1996: a bead 2 mm in diameter is deposited on a metal sheet, which is then placed vertically. The evaluation consists in quantifying the run, if any, of the bead (in mm). In the case of ESA 7142 PEX, the run is 0 mm.

3.2 Mechanical Properties on Test Pieces H2

3.2.a. In the Initial State

To do this, a 2 mm film is prepared: the product is crosslinked for 1 hour at 150° C. under a heating press. The test pieces are then removed: a measurement of the Shore A hardness is carried out and the mechanical properties (tear strength, modulus, elongation are then evaluated using a tensile testing machine of Zwick type with a tensile speed of 500 mm/min.

| | |
|---|---|
| Shore A hardness: | 44 |
| Tensile strength: | 2.8 Mpa |
| Elongation: | 200% |
| 100% modulus: | 1.4 Mpa |

3.2.b. On Contact with Engine Fluids

Using test pieces H2 prepared and evaluated as above, which have been subjected after crosslinking to an immersion for 72 hours in the fluid under consideration.

| | |
|---|---|
| Fluid: | 15W40 oil specification API SJ Temperature 150° C. |
| Shore A hardness: | 27 |
| Tensile strength: | 1.8 Mpa |
| Elongation: | 189% |
| 100% modulus: | 1.0 Mpa |

3.2.c. With Thermal Stresses

Using test pieces H2 prepared and evaluated as above, but which have been subjected to a heat aging of 72 hours.

| | |
|---|---|
| Temperature: | 250° C. |
| Shore A hardness: | 50 |
| Tensile strength: | 2.0 Mpa |
| Elongation: | 70% |

3) Adhesion Properties

Supports used:

aluminum AG3 test pieces

Polyamide 66 test pieces containing 30% glass fibers.

Test pieces are 100 mm×25.0 mm×4 mm in size.

The bonding surface is 312.5 $mm^2$ (12.5×25) and the bonding thickness is 1 mm.

The assembly is placed for 2 hours at 130° C. in an oven.

The adhesion is measured by means of a tensile shear test performed using a tensile testing machine of Zwick type: the tensile strength of the assembly and the pattern of failure (adhesive failure or cohesive failure if the failure is in the bulk of the material) are determined. The tensile speed is 10 mm/min.

Aluminium support: tensile strength=2.0 Mpa–90 to 100% cohesive failure.

Polyamide support: tensile strength=1.8–90 to 100% cohesive failure.

3.4) Compressive Set—Elastic Return of the Joint

Slugs are molded with the elastomer under consideration (ASE 1): the product is cast in a cavity so as to obtain slugs with a diameter of 29 mm and a height of 25 mm. The whole is placed under a heating press at 150° C. for a period of 1 hour.

After removing the slugs from the mold, cooling and measuring the height of the slugs ($h_i$), these same slugs are compressed to 25% by means of small presses with calibrated wedges of height $H_c$ for 72 hours at 150° C. Dismantling is carried out while hot and, 30 min later, the height of the slugs is remeasured ($h_f$).

The compressive set (CS) is then calculated by means of the formula:

$$CS(h_i-h_f)(h_i-h_c)$$

With the SCI of Example 2, a value of between 35% and 40% is obtained.

Example 4

Bonding Assembly Application Using the SCI of Example 2

The SCI composition of Example 2 is extruded with a two-component unit equipped with a static mixer and then coated on the reverse side of velvet fabric with a weight per unit area of 150 g/m² (2 mm doctor blade). The coated face is then assembled on a metal lattice reinforced with a cotton fabric. The fabric is then pasted to allow good wetting of the fiber with the silicone paste, after which the assembly is crosslinked for 1 hour at 130° C. Test pieces 5 cm wide are then cut out to perform a peeling test at 180° C. using a Zwick tensile unit at a speed of 50 mm/min (±2). The adhesion forces measured by peeling are 10 N/cm with a cohesive failure in the mass of the elastomer.

The invention claimed is:

1. A method for pointing a joint between and/or adhering at least two solid parts together, comprising utilizing a non-drip, thixotropic silicone elastomer composition to point a joint and/or adhere said parts, wherein said composition is crosslinkable by polyaddition, and wherein said composition comprises polyorganosiloxanes (POSs) bearing ≡Si—$C_2$–$C_6$ alkenyl units and polyorganosiloxanes (POSs) bearing ≡Si—H units and at least one fluorinated resin.

2. The method of claim 1, wherein said fluorinated resin, which is based on polyfluoroolefin (PFO), is in dry pulverulent form or in the form of a dispersion and is incorporated in a proportion of from 0.1% to 10% by dry weight relative to the total dry matter of the composition.

3. The method of claim 1, wherein the POSs of the non-drip silicone elastomer composition, which is crosslinkable by polyaddition and to which fluorinated resin is added, consist of siloxy units of formula

and/or of siloxy units of formula:

in which formulae the various symbols have the following meaning:

the symbols R, which may be identical or different, each represent a nonhydrolyzable group of hydrocarbon-based nature, this radical being selected from:
an alkyl radical containing from 1 to 5 carbon atoms optionally comprising from 1 to 6 chlorine atoms,
cycloalkyl radicals containing from 3 to 8 carbon atoms optionally containing from 1 to 4 chlorine atoms,
aryl or alkylaryl radicals containing from 6 to 8 carbon atoms optionally containing from 1 to 4 chlorine atoms,
cyanoalkyl radicals containing from 3 to 4 carbon atoms; methyl groups; ethyl groups; propyl groups; isopropyl groups; butyl groups; isobutyl groups; n-pentyl groups; t-butyl groups; chloromethyl groups; dichloromethyl groups; a-chloroethyl groups; a,b-dichloroethyl groups; b-cyanoethyl groups; g-cyanopropyl groups; phenyl groups; p-chlorophenyl groups; m-chlorophenyl groups; 3,5-dichlorophenyl groups; trichlorophenyl groups; tetrachlorophenyl groups; o-, p- or m-tolyl groups; xylyl groups; 2,3-dimethylphenyl;

symbols Z each representing a hydrogen atom or a $C_2$–$C_6$ alkenyl group;
n=an integer equal to 0, 1, 2 or 3;
x=an integer equal to 0, 1, 2 or 3;
y=an integer equal to 0, 1 or 2;
the sum x+y being in the range from 1 to 3.

4. The method of claim 1, wherein the non-drip silicone elastomer composition, which is crosslinkable by polyaddition and to which fluorinated resin is added, comprises
A. at least one polyorganosiloxane containing, per molecule, at least two $C_2$–$C_6$ alkenyl groups linked to the silicon,
B. at least one polyorganosiloxane containing, per molecule, at least two hydrogen atoms linked to the silicon,
C. a catalytically effective amount of at least one catalyst composed of at least one metal belonging to the platinum group,
D. optionally at least one POS resin,
E. optionally an adhesion promoter,
F. optionally, a reinforcing or nonreinforcing mineral filler,
G. a polyorganosiloxane termed as an extender and containing terminal siloxyl units containing hydrogeno functions,
H. optionally, a neutralizer,
I. optionally, a crosslinking inhibitor and/or other additive(s) for use in said composition,
J. and, optionally, expanded or expandable mineral hollow microsphere fillers.

5. The method of claim 1, wherein the non-drip silicone elastomer composition, which is crosslinkable by polyaddition and to which fluorinated resin is added, comprises:
A. at least one polyorganosiloxane containing, per molecule, at least two $C_2$–$C_6$ alkenyl groups linked to the silicon,
B. at least one polyorganosiloxane containing, per molecule, at least two hydrogen atoms linked to the silicon,
C. a catalytically effective amount of at least one catalyst composed of at least one metal belonging to the platinum group,
D. optionally at least one POS resin, bearing radicals Z representing $C_2$–$C_6$ alkenyl or H linked to the silicon,
E. optionally an adhesion promoter, which is ternary, and consisting of:
  ΔE.1. Δat least one alkoxy organosilane containing, per molecule, at least one $C_2$–$C_6$ alkenyl group,
  ΔE.2. Δat least one organosilicon compound comprising at least one epoxy radical,
  ΔE.3. Δat least one chelate of a metal M and/or a metal alkoxide of general formula: M(OJ)n, with n=valency of M and J=linear or branched $C_1$–$C_8$ alkyl, M being chosen from the group consisting of: Ti, Zr, Ge, Li, Mn, Fe, Al and Mg,
F. optionally, a reinforcing or nonreinforcing mineral filler,
G. a polyorganosiloxane termed as an extender and containing terminal siloxyl units containing hydrogeno functions,
H. optionally, a neutralizer,
I. optionally, a crosslinking inhibitor and/or other additive(s) for use in said composition, J. and, optionally, expanded or expandable mineral hollow microsphere fillers.

6. The method of claim 1, wherein the non-drip silicone elastomer composition, which is crosslinkable by polyaddition and to which fluorinated resin is added, comprises:
   A. at least one polyorganosiloxane containing, per molecule, at least two $C_2$–$C_6$ alkenyl groups linked to the silicon,
   B. at least one polyorganosiloxane containing, per molecule, at least two hydrogen atoms linked to the silicon,
   C. a catalytically effective amount of at least one catalyst composed of at least one metal belonging to the platinum group,
   D. optionally at least one POS resin,
   E. optionally an adhesion promoter,
   F. optionally, a reinforcing or nonreinforcing mineral filler,
   G. a polyorganosiloxane termed as an extender and containing terminal siloxyl units containing hydrogeno functions,
   H. optionally, a neutralizer,
   I. optionally, a crosslinking inhibitor and/or other additive(s) for use in said composition,
   J. and, optionally, expanded or expandable mineral hollow microsphere fillers,
   POS constituent(s) A and/or D of the non-drip silicone elastomer composition is (are) chosen from alkenylsilyl POSs with a viscosity $\eta$ at 25° C. such that:

$2500 \leq \eta \leq 100000$ mPa·s.

7. The method of claim 1, wherein the non-drip silicone elastomer composition, which is crosslinkable by polyaddition and to which fluorinated resin is added, comprises:
   A. at least one polyorganosiloxane containing, per molecule, at least two $C_2$–$C_6$ alkenyl groups linked to the silicon,
   B. at least one polyorganosiloxane containing, per molecule, at least two hydrogen atoms linked to the silicon,
   C. a catalytically effective amount of at least one catalyst composed of at least one metal belonging to the platinum group,
   D. optionally at least one POS resin,
   E. optionally an adhesion promoter,
   F. optionally, a reinforcing or nonreinforcing mineral filler,
   G. a polyorganosiloxane termed as an extender and containing terminal siloxyl units containing hydrogeno functions,
   H. optionally, a neutralizer,
   I. optionally, a crosslinking inhibitor and/or other additive(s) for use in said composition,
   J. and, optionally, expanded or expandable mineral hollow microsphere fillers,
   POS constituent (s) A and/or D of the non-drip silicone elastomer composition is (are) chosen from alkenylsilyl POSs with a viscosity $\eta'$ at 25° C. such that:

$10000 \leq \eta' \leq 200000$ mPa·s.

8. The method of claim 1, wherein the non-drip silicone elastomer composition, which is crosslinkable by polyaddition and to which fluorinated resin is added, has a Matthis flow index (MF) such that:

MF<0.1.

9. A two-component system, which is a precursor of a non-drip silicone elastomer composition comprising polyorganosiloxanes (POSs) bearing ≡Si—$C_2$–$C_6$ alkenyl units and ≡Si—H units, which is crosslinkable by polyaddition, and at least one fluorinated resin as a thixotropic agent, said non-drip silicone elastomer composition comprising:
   A. at least one polyorganosiloxane containing, per molecule, at least two $C_2$–$C_6$ alkenyl groups linked to the silicon,
   B. at least one polyorganosiloxane containing, per molecule, at least two hydrogen atoms linked to the silicon,
   C. a catalytically effective amount of at least one catalyst composed of at least one metal belonging to the platinum group,
   D. optionally at least one POS resin, bearing radicals Z representing $C_2$–$C_6$ alkenyl or H linked to the silicon,
   E. optionally an adhesion promoter, which is ternary, and consisting of:
      ▲E.1. ▲at least one alkoxy organosilane containing, per molecule, at least one $C_2$–$C_6$ alkenyl group,
      ▲E.2. ▲at least one organosilicon compound comprising at least one epoxy radical,
      ▲E.3. ▲at least one chelate of a metal M and/or a metal alkoxide of general formula: $M(OJ)_n$, with n=valency of M and J=linear or branched $C_1$–$C_8$ alkyl, M being chosen from the group consisting of: Ti, Zr, Ge, Li, Mn, Fe, Al and Mg,
   F. optionally, a reinforcing or nonreinforcing mineral filler,
   G. a polyorganosiloxane termed as an extender and containing terminal siloxyl units containing hydrogeno functions,
   H. optionally, a neutralizer,
   I. optionally, a crosslinking inhibitor and/or other additive(s) for use in said composition,
   J. and, optionally, expanded or expandable mineral hollow microsphere fillers;
   the two-component system being characterized in that:
      it is in two separate parts $P_2$ and $P_2$ which are intended to be mixed together to form the composition,
      one of the two parts $P_1$ or $P_2$ comprises one or more POSs (A and/or D) or (B) bearing a single species of crosslinking groups, ≡Si-alkenyl or ≡Si—H, respectively; and
      when the promoter E comprising E.1, E.2, E.3 is present, the part $P_1$ or $P_2$ containing the POS (B) bearing only ≡Si—H is free of compound E.3 of the promoter (E) and of the part $P_1$ or $P_2$ including (E.1) of the promoter (E) not comprising the catalyst (C) and
      at least one of the two parts $P_1$ or $P_2$ further contain said at least one fluorinated resin.

10. A method of utilizing a two-component system, which is a precursor of a non-drip silicone elastomer composition, comprising polyorganosiloxanes (POSs) bearing ≡Si—$C_2$–$C_6$ alkenyl units and ≡Si—H units, which is crosslinkable by polyaddition, and at least one fluorinated resin as a thixotropic agent, said composition comprising:
   A. at least one polyorganosiloxane containing, per molecule, at least two $C_2$–$C_6$ alkenyl groups linked to the silicon,
   B. at least one polyorganosiloxane containing, per molecule, at least two hydrogen atoms linked to the silicon,
   C. a catalytically effective amount of at least one catalyst composed of at least one metal belonging to the platinum group,
   D. optionally at least one POS resin, bearing radicals Z representing $C_2$–$C_6$ alkenyl or H linked to the silicon,
   E. optionally an adhesion promoter, which is ternary, and consisting of:

▲E.1. ▲at least one alkoxy organosilane containing, per molecule, at least one $C_2$–$C_6$ alkenyl group,
▲E.2. ▲at least one organosilicon compound comprising at least one epoxy radical,
▲E.3. ▲at least one chelate of a metal M and/or a metal alkoxide of general formula: $M(OJ)_n$, with n=valency of M and J=linear or branched $C_1$–$C_8$ alkyl, M being chosen from the group consisting of: Ti, Zr, Ge, Li, Mn, Fe, Al and Mg,
F. optionally, a reinforcing or nonreinforcing mineral filler,
G. a polyorganosiloxane termed as an extender and containing terminal siloxyl units containing hydrogeno functions,
H. optionally, a neutralizer,
I. optionally, a crosslinking inhibitor and/or other additive(s) for use in said composition,
J. and, optionally, expanded or expandable mineral hollow microsphere fillers, the two-component system having the following features:
it is in two separate parts $P_1$ and $P_2$ which are intended to be mixed together to form the composition,
one of the two parts $P_1$ or $P_2$ comprises one or more POSs (A and/or D) or (B) bearing a single species of crosslinking groups, ≡Si-alkenyl or ≡Si—H, respectively; and
when the promoter E comprising E.1, E.2, E.3 is present, the part $P_1$ or $P_2$ containing the POS (B) bearing only ≡Si—H is free of compound E.3 of the promoter (E) and of the part $P_1$ or $P_2$ including (E.1) of the promoter (E) not comprising the catalyst (C), and
at least one of the two parts $P_1$ or $P_2$ further contain said at least one fluorinated resin for manufacturing joints "in situ" by adhering at least two solid elements which are to be assembled.

11. A method of utilizing a two-component system, which is a precursor of a non-drip silicone elastomer composition comprising polyorganosiloxanes (POSs) bearing ≡Si—$C_2$–$C_6$ alkenyl units and ≡Si—H units, which is crosslinkable by polyaddition, and at least one fluorinated resin as a thixotropic agent, said composition comprising:
A. at least one polyorganosiloxane containing, per molecule, at least two $C_2$–$C_6$ alkenyl groups linked to the silicon,
B. at least one polyorganosiloxane containing, per molecule, at least two hydrogen atoms linked to the silicon,
C. a catalytically effective amount of at least one catalyst composed of at least one metal belonging to the platinum group,
D. optionally at least one POS resin, bearing radicals Z representing $C_2$–$C_6$ alkenyl or H linked to the silicon,
E. optionally an adhesion promoter, which is ternary, and consisting of:
▲E.1. ▲at least one alkoxy organosilane containing, per molecule, at least one $C_2$–$C_6$ alkenyl group,
▲E.2. ▲at least one organosilicon compound comprising at least one epoxy radical,
▲E.3. ▲at least one chelate of a metal M and/or a metal alkoxide of general formula: $M(OJ)_n$, with n=valency of M and J=linear or branched $C_1$–$C_8$ alkyl, M being chosen from the group consisting of: Ti, Zr, Ge, Li, Mn, Fe, Al and Mg,
F. optionally, a reinforcing or nonreinforcing mineral filler,
G. a polyorganosiloxane termed as an extender and containing terminal siloxyl units containing hydrogeno functions,
H. optionally, a neutralizer,
I. optionally, a crosslinking inhibitor and/or other additive (s) for use in said composition,
J. and, optionally, expanded or expandable mineral hollow microsphere fillers, the two-component system having the following features:
it is in two separate parts $P_1$ and $P_2$ which are intended to be mixed together to form the composition,
one of the two parts $P_1$ or $P_2$ comprises one or more POSs (A and/or D) or (B) bearing a single species of crosslinking groups, ≡Si-alkenyl or ≡Si—H, respectively; and
when the promoter E comprising E.1, E.2, E.3 is present, the part $P_1$ or $P_2$ containing the POS (B) bearing only ≡Si—H is free of compound E.3 of the promoter (E) and of the part $P_1$ or $P_2$ including (E.1) of the promoter (E) not comprising the catalyst (C), and
at least one of the two parts $P_1$ or $P_2$ further contain said at least one fluorinated resin for manufacturing crushed joints, component profile joints or injected or extruded joints by adhering at least two solid elements which are to be assembled.

12. The method of claim 11, in the production of crushed joints, wherein said method comprises:
producing at least one thixotropic bead using a two-component system, which is a precursor of a non-drip silicone elastomer composition comprising polyorganosiloxanes (POSs) bearing ≡Si—$C_2$–$C_6$alkenyl units and ≡Si—H units, which is crosslinkable by polyaddition, and at least one fluorinated resin as a thixotropic agent, said composition comprising:
A. at least one polyorganosiloxane containing, per molecule, at least two $C_2$–$C_6$ alkenyl groups linked to the silicon,
B. at least one polyorganosiloxane containing, per molecule, at least two hydrogen atoms linked to the silicon,
C. a catalytically effective amount of at least one catalyst composed of at least one metal belonging to the platinum group,
D. optionally at least one POS resin, bearing radicals Z representing $C_2$–$C_6$ alkenyl or H linked to the silicon,
E. optionally an adhesion promoter, which is ternary, and consisting of:
▲E.1. ▲at least one alkoxy organosilane containing, per molecule, at least one $C_2$–$C_6$ alkenyl group,
▲E.2. ▲at least one organosilicon compound comprising at least one epoxy radical,
▲E.3. ▲at least one chelate of a metal M and/or a metal alkoxide of general formula: $M(OJ)_n$, with n=valency of M and J=linear or branched $C_1$–$C_8$ alkyl, M being chosen from the group consisting of: Ti, Zr, Ge, Li, Mn, Fe, Al and Mg,
F. optionally, a reinforcing or nonreinforcing mineral filler,
G. a polyorganosiloxane termed as an extender and containing terminal siloxyl units containing hydrogeno functions,
H. optionally, a neutralizer,
I. optionally, a crosslinking inhibitor and/or other additive(s) for use in said composition,
J. and, optionally, expanded or expandable mineral hollow microsphere fillers, the two-component system having the following features:
it is in two separate parts $P_1$ and $P_2$ which are intended to be mixed together to form the composition, one of the two parts $P_1$ or $P_2$ comprises one or more POSs (A and/or D) or (B) bearing a single species of crosslinking groups, $\equiv$Si-alkenyl or $\equiv$Si—H, respectively; and when the promoter E comprising E.1, E.2, E.3 is present, the part $P_1$ or $P_2$ containing the POS (B) bearing only $\equiv$Si—H is free of compound E.3 of the promoter (E) and of the part $P_1$ or $P_2$ including (E.1) of the promoter (E) not comprising the catalyst (C), and at least one of the two parts $P_1$ or $P_2$ further contain said at least one fluorinated resin in depositing said at least one thixotropic bead on the contact zone of at least one of at least two solid elements to be assembled in assembling said elements by applying them to each other via their contact zone, in arranging it such that crosslinking of the elastomer takes place.

13. The method of claim 11, for producing component profile joints between at least two solid elements to be assembled, wherein said method comprises:

producing at least one thixotropic bead using a two-component system, which is a precursor of a non-drip silicone elastomer composition comprising polyorganosiloxanes (POSs) bearing $\equiv$Si—$C_2$–$C_6$ alkenyl units and $\equiv$Si—H units, which is crosslinkable by polyaddition, and at least one fluorinated resin as a thixotropic agent, said composition comprising:

A. at least one polyorganosiloxane containing, per molecule, at least two $C_2$–$C_6$ alkenyl groups linked to the silicon, B. at least one polyorganosiloxane containing, per molecule, at least two hydrogen atoms linked to the silicon, C. a catalytically effective amount of at least one catalyst composed of at least one metal belonging to the platinum group, D. optionally at least one POS resin, bearing radicals Z representing $C_2$–$C_6$ alkenyl or H linked to the silicon, E. optionally an adhesion promoter, which is ternary, and consisting of:
  E.1. at least one alkoxy organosilane containing, per molecule, at least one $C_2$–$C_6$ alkenyl group,
  E.2. at least one organosilicon compound comprising at least one epoxy radical,
  E.3. at least one chelate of a metal M and/or a metal alkoxide of general formula: $M(OJ)_n$, with n=valency of M and J=linear or branched $C_1$–$C_8$ alkyl, M being chosen from the group consisting of: Ti, Zr, Ge, Li, Mn, Fe, Al and Mg, F. optionally, a reinforcing or nonreinforcing mineral filler, G. a polyorganosiloxane termed as an extender and containing terminal siloxyl units containing hydrogeno functions, H. optionally, a neutralizer, I. optionally, a crosslinking inhibitor and/or other additive(s) for use in said composition, J. and, optionally, expanded or expandable mineral hollow microsphere fillers, the two-component system having the following features:
it is in two separate parts $P_1$ and $P_2$ which are intended to be mixed together to form the composition,
one of the two parts $P_1$ or $P_2$ comprises one or more POSs (A and/or D) or (B) bearing a single species of crosslinking groups, $\equiv$Si-alkenyl or $\equiv$Si—H, respectively; and when the promoter E comprising E.1, E.2, E.3 is present, the part $P_1$ or $P_2$ containing the POS (B) bearing only $\equiv$Si—H is free of compound E.3 of the promoter (E) and of the part $P_1$ or $P_2$ including (E.1) of the promoter (E) not comprising the catalyst (C), and at least one of the two parts $P_1$ or $P_2$ further contain said at least one fluorinated resin in depositing said at least one thixotropic bead onto the contact zone of at least one of the at least two solid elements to be assembled, in arranging it such that crosslinking of the elastomer for forming the bead takes place, and in assembling the solid elements by applying them together at least via the contact zone comprising the bead.

14. The method of claim 11, for the production of injected joints using injection devices comprising molds in which the elastomer undergoes heat crosslinking, or of extruded joints using extruders, at the outlet of which the elastomer undergoes heat crosslinking.

15. Joint obtained by applying a non-drip silicone elastomer composition comprising polyorganosiloxanes (POSs) bearing $\equiv$Si—$C_2$–$C_6$ alkenyl units and $\equiv$Si—H units, which is crosslinkable by polyaddition, and at least one fluorinated resin as a thixotropic agent;

and/or by applying a two-component system, which is a precursor of a non-drip silicon elastomer composition comprising polyorganosiloxanes (POSs) bearing $\equiv$Si—$C_2$–$C_6$alkenyl units and $\equiv$Si—H units, which is crosslinkable by polyaddition, and at least one fluorinated resin as a thixotropic agent, said composition comprising:

A. at least one polyorganosiloxane containing, per molecule, at least two $C_2$–$C_6$ alkenyl groups linked to the silicon, B. at least one polyorganosiloxane containing, per molecule, at least two hydrogen atoms linked to the silicon, C. a catalytically effective amount of at least one catalyst composed of at least one metal belonging to the platinum group, D. optionally at least one POS resin, bearing radicals Z representing $C_2$–$C_6$ alkenyl or H linked to the silicon, E. optionally an adhesion promoter, which is ternary, and consisting of:
  E.1. at least one alkoxy organosilane containing, per molecule, at least one $C_2$–$C_6$ alkenyl group,
  E.2. at least one organosilicon compound comprising at least one epoxy radical,
  E.3. at least one chelate of a metal M and/or a metal alkoxide of general formula: $M(OJ)_n$, with n=valency of M and J=linear or branched $C_1$–$C_8$ alkyl, M being chosen from the group consisting of: Ti, Zr, Ge, Li, Mn, Fe, Al and Mg, F. optionally, a reinforcing or nonreinforcing mineral filler, G. a polyorganosiloxane termed as an extender and containing terminal siloxyl units containing hydrogeno functions, H. optionally, a neutralizer, I. optionally, a crosslinking inhibitor and/or other additive(s) for use in said composition, J. and, optionally, expanded or expandable mineral hollow microsphere fillers;

the two-component system having the following features:
it is in two separate parts $P_1$ and $P_2$ which are intended to be mixed together to form the composition, one of the two parts $P_1$ or $P_2$ comprises one or more POSs (A and/or D) or (B) bearing a single species of crosslinking groups, Si-alkenyl or ≡Si—H, respectively; and when the promoter E comprising E.1, E.2, E.3 is present, the part $P_1$ or $P_2$ containing the POS (B) bearing only ≡Si—H is free of compound E.3 of the promoter (E) and of the part $P_1$ or $P_2$ including (E.1) of the promoter (E) not comprising the catalyst (C), and at least one of the two parts $P_1$ or $P_2$ further contain said at least one fluorinated resin as an adhesive, for assembling at least two solid elements to be assembled, wherein said method consists essentially:

in coating at least one of the solid elements to be assembled, with a layer of said non-drip silicone elastomer composition and/or with said system, in assembling the solid elements by applying them together, and in crosslinking the elastomer adhesive.

16. The joint of claim 15, wherein one of the elements to be assembled is a woven, knitted or nonwoven fibrous material based on natural and/or synthetic fibers.

17. A method of utilizing a non-drip silicone elastomer composition, comprising polyorganosiloxanes (POSs) bearing ≡Si—$C_2$–$C_6$ alkenyl units and ≡Si—H units, which is crosslinkable by polyaddition, and at least one fluorinated resin as a thixotropic agent, said composition comprising:

A. at least one polyorganosiloxane containing, per molecule, at least two $C_2$–$C_6$ alkenyl groups linked to the silicon, B. at least one polyorganosiloxane containing, per molecule, at least two hydrogen atoms linked to the silicon, C. a catalytically effective amount of at least one catalyst composed of at least one metal belonging to the platinum group, D. optionally at least one POS resin, bearing radicals Z representing $C_2$–$C_6$ alkenyl or H linked to the silicon, E. optionally an adhesion promoter, which is ternary, and consisting of:

⋏E.1. ⋏at least one alkoxy organosilane containing, per molecule, at least one $C_2$–$C_6$ alkenyl group, ⋏E.2. ⋏at least one organosilicon compound comprising at least one epoxy radical, ⋏E.3. ⋏at least one chelate of a metal M and/or a metal alkoxide of general formula: $M(OJ)n$, with n=valency of M and J=linear or branched $C_1$–$C_8$ alkyl, M being chosen from the group consisting of: Ti, Zr, Ge, Li, Mn, Fe, Al and Mg, F. optionally, a reinforcing or nonreinforcing mineral filler, G. a polyorganosiloxane termed as an extender and containing terminal siloxyl units containing hydrogeno functions, H. optionally, a neutralizer, I. optionally, a crosslinking inhibitor and/or other additive(s) for use in said composition, J. and, optionally, expanded or expandable mineral hollow microsphere fillers, for manufacturing joints "in situ" by adhering at least two solid elements to be assembled, and wherein in the case of room temperature vulcanizing (RTV) compositions crosslinkable by polyaddition reactions, the polyorganosiloxane constituents bearing alkenylsilyl groups (A and/or D) have a viscosity η at 25° C.:

$2500 \leq \eta 100000$ mPa·s, and wherein in the case of liquid silicone rubber (LSR) compositions crosslinkable by polyaddition reactions, the polyorganosiloxane constituents) bearing alkenylsilyl groups (B) have a viscosity η' at 25° C.:

$10000 \leq \eta' \leq 200000$ mPa·s.

18. A method of utilizing a non-drip silicone elastomer composition comprising polyorganosiloxanes (POSs) bearing ≡Si—$C_2$–$C_6$alkenyl units and ≡Si—H units, which is crosslinkable by polyaddition, and at least one fluorinated resin as a thixotropic agent, said composition comprising A. at least one polyorganosiloxane containing, per molecule, at least two $C_2$–$C_6$ alkenyl groups linked to the silicon, B. at least one polyorganosiloxane containing, per molecule, at least two hydrogen atoms linked to the silicon, C. a catalytically effective amount of at least one catalyst composed of at least one metal belonging to the platinum group, D. optionally at least one POS resin, bearing radicals Z representing $C_2$–$C_6$ alkenyl or H linked to the silicon, E. optionally an adhesion promoter, which is ternary, and consisting of:

⋏E.1. ⋏at least one alkoxy organosilane containing, per molecule, at least one $C_2$–$C_6$ alkenyl group, ⋏E.2. ⋏at least one organosilicon compound comprising at least one epoxy radical, ⋏E.3. ⋏at least one chelate of a metal M and/or a metal alkoxide of general formula: $M(OJ)_n$, with n=valency of M and J=linear or branched $C_1$–$C_8$ alkyl, M being chosen from the group consisting of: Ti, Zr, Ge, Li, Mn, Fe, Al and Mg, F. optionally, a reinforcing or nonreinforcing mineral filler, G. a polyorganosiloxane termed as an extender and containing terminal siloxyl units containing hydrogeno functions, H. optionally, a neutralizer, I. optionally, a crosslinking inhibitor and/or other additive(s) for use in said composition, J. and, optionally, expanded or expandable mineral hollow microsphere fillers, for manufacturing crushed joints, component profile joints or injected or extruded joints by adhering at least two solid elements to be assembled, wherein in the case of room temperature vulcanizing (RTV) compositions crosslinkable by polyaddition reactions, the polyorganosiloxane constituent(s) bearing alkenylsilyl groups (A and/or D) have a viscosity η at 25° C.:

$2500 \leq \eta \leq 100000$ mPa·s, and wherein in the case of liquid silicone rubber (LSR) compositions crosslinkable by polyaddition reactions, the polyorganosiloxane constituent(s) bearing alkenylsilyl groups (B) have a viscosity η' at 25° C.:

$10000 \leq \eta' \leq 200000$ mPa·s.

19. The method of claim 18, in the production of crushed joints, wherein said method comprises:

producing at least one thixotropic bead using a non-drip silicone elastomer composition comprising polyorganosiloxanes (POSs) bearing ≡Si—$C_2$–$C_6$ alkenyl units and ≡Si—H units, which is crosslinkable by polyaddition, and at least one fluorinated resin as a thixotropic agent, said composition comprising:

A. at least one polyorganosiloxane containing, per molecule, at least two $C_2$–$C_6$ alkenyl groups linked to the silicon,
B. at least one polyorganosiloxane containing, per molecule, at least two hydrogen atoms linked to the silicon,
C. a catalytically effective amount of at least one catalyst composed of at least one metal belonging to the platinum group,
D. optionally at least one POS resin, bearing radicals Z representing $C_1$–$C_6$ alkenyl or H linked to the silicon,
E. optionally an adhesion promoter, which is ternary, and consisting of:
   E.1. at least one alkoxy organosilane containing, per molecule, at least one $C_2$–$C_6$ alkenyl group,
   E.2. at least one organosilicon compound comprising at least one epoxy radical,
   E.3. at least one chelate of a metal M and/or a metal alkoxide of general formula: $M(OJ)_n$, with n=valency of M and J=linear or branched $C_1$–$C_8$ alkyl, M being chosen from the group consisting of: Ti, Zr, Ge, Li, Mn, Fe, Al and Mg,
F. optionally, a reinforcing or nonreinforcing mineral filler,
G. a polyorganosiloxane termed as an extender and containing terminal siloxyl units containing hydrogeno functions,
H. optionally, a neutralizer,
I. optionally, a crosslinking inhibitor and/or other additive(s) for use in said composition,
J. and, optionally, expanded or expandable mineral hollow microsphere fillers,
   depositing said at least one thixotropic bead on a contact zone of at least one of at least two solid elements to be assembled,
   assembling the elements by applying them to each other via their contact zone,
   arranging it such that crosslinking of the elastomer takes place, wherein in the case of room temperature vulcanizing (RTV) compositions crosslinkable by polyaddition reactions, the polyorganosiloxane constituent(s) bearing alkenylsilyl groups (A and/or D) have a viscosity η at 25° C.:

$2500 \leq \eta \leq 100000$ mPa·s, and wherein in the case of liquid silicone rubber (LSR) compositions crosslinkable by polyaddition reactions, the polyorganosiloxane constituent(s) bearing alkenylsilyl groups (B) have a viscosity η' at 25° C.:

$10000 \leq \eta' \leq 200000$ mPa·s.

20. The method of claim 18, for producing component profile joints between at least two solid elements to be assembled, wherein said method comprises:

producing at least one thixotropic bead using a non-drip silicone elastomer composition comprising polyorganosiloxanes (POSs) bearing ≡Si—$C_2$–$C_6$alkenyl units and ≡Si—H units, which is crosslinkable by polyaddition, and to which one fluorinated resin is added as a thixotropic agent, depositing said at least one thixotropic bead onto a contact zone of at least one of the at least two solid elements to be assembled, arranging it such that crosslinking of the elastomer for forming the bead takes place, and assembling the solid elements by applying them together at least via the contact zone comprising the bead.

21. The method of claim 18, for the production of injected joints using injection devices comprising molds in which the elastomer undergoes heat crosslinking, or of extruded joints using extruders, at the outlet of which the elastomer undergoes heat crosslinking.

* * * * *